US012691945B2

(12) United States Patent
Shin et al.

(10) Patent No.: US 12,691,945 B2
(45) Date of Patent: Jul. 28, 2026

(54) REINFORCED STRUCTURE OF VEHICLE FOR ABSORBING SIDE COLLISION

(71) Applicants: Hyundai Motor Company, Seoul (KR); Kia Corporation, Seoul (KR)

(72) Inventors: Seong-Su Shin, Seoul (KR); Jang-Won Hong, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 391 days.

(21) Appl. No.: 18/368,326

(22) Filed: Sep. 14, 2023

(65) Prior Publication Data

US 2024/0383533 A1     Nov. 21, 2024

(30) Foreign Application Priority Data

May 18, 2023     (KR) ......................... 10-2023-0064320

(51) Int. Cl.
| | |
|---|---|
| *B62D 21/15* | (2006.01) |
| *B62D 21/03* | (2006.01) |
| *B62D 25/02* | (2006.01) |
| *B62D 25/20* | (2006.01) |

(52) U.S. Cl.
CPC .......... *B62D 21/157* (2013.01); *B62D 21/03* (2013.01); *B62D 25/025* (2013.01); *B62D 25/2036* (2013.01); *B60Y 2306/01* (2013.01)

(58) Field of Classification Search
CPC ...... B62D 21/15; B62D 21/157; B62D 25/02; B62D 25/025; B62D 25/2036; B62D 25/20
USPC .... 296/187.12, 193.05, 203.03, 209, 187.08, 296/204, 193.07
See application file for complete search history.

(56) References Cited

U.S. PATENT DOCUMENTS

| | | | |
|---|---|---|---|
| 9,272,637 B2 | 3/2016 | Han et al. | |
| 10,822,035 B2 | 11/2020 | Takahashi | |
| 2009/0066118 A1* | 3/2009 | Tosaka ............... | B62D 25/2036 296/204 |
| 2010/0237659 A1* | 9/2010 | Ishigame ............. | B62D 21/157 296/204 |
| 2012/0161429 A1* | 6/2012 | Rawlinson ........... | B62D 25/025 280/801.1 |
| 2015/0166120 A1 | 6/2015 | Han et al. | |

(Continued)

FOREIGN PATENT DOCUMENTS

| | | | | |
|---|---|---|---|---|
| DE | 10224454 A1 * | 12/2003 | ............. | B62D 25/20 |
| DE | 102008009804 A1 * | 8/2009 | ............. | B62D 25/20 |

(Continued)

OTHER PUBLICATIONS

JP translation (Year: 2008).*
DE translation (Year: 2003).*

*Primary Examiner* — Amy R Weisberg
*Assistant Examiner* — Denise L. Esquivel
(74) *Attorney, Agent, or Firm* — Fox Rothschild LLP

(57)     ABSTRACT

A side lower structure of a vehicle includes a seat cross member disposed in a width direction of the vehicle and assembled to a floor panel of the vehicle, a seat cross member extension assembled to the seat cross member and connecting a side sill inner with the seat cross member, and inclined ribs formed in the width direction of the vehicle, and disposed to be spaced by a predetermined distance from each other on the seat cross member extension in a longitudinal direction of the vehicle.

17 Claims, 13 Drawing Sheets

(56)     References Cited

U.S. PATENT DOCUMENTS

2019/0144038  A1     5/2019   Takahashi
2024/0359747  A1*  10/2024   Kang ................. B62D 25/2036

FOREIGN PATENT DOCUMENTS

| | | | | | |
|---|---|---|---|---|---|
| DE | 102012109464 | A1 | * | 5/2014 | ........... B62D 29/008 |
| JP | 2008143292 | A | * | 6/2008 | |
| JP | 2008189137 | A | * | 8/2008 | |
| JP | 5053406 | B2 | | 10/2012 | |
| JP | 2020-152188 | A | | 9/2020 | |
| JP | 6954024 | B2 | | 10/2021 | |
| KR | 20-1997-0051616 | | | 9/1997 | |
| KR | 10-1526397 | B1 | | 6/2015 | |

* cited by examiner (FRONT)

| | |
|---|---|
| ◯ | FDS |
| ▢ | SPR |
| ⬡ | Bolting |
| ▬ | MIG WELDING |

REINFORCED STRUCTURE OF VEHICLE FOR ABSORBING SIDE COLLISION

CROSS-REFERENCE TO RELATED APPLICATION

This application claims under 35 U.S.C. § 119(a) the benefit of Korean Patent Application No. 10-2023-0064320, filed on May 18, 2023, the entire contents of which are incorporated herein by reference.

BACKGROUND

(a) Technical Field

The present disclosure relates to a reinforced structure of a vehicle for absorbing a side collision, more particularly, to a side lower structure of the vehicle that is configured to transmit a collision load to a seat cross member to improve stiffness of a side sill and to prevent rotation and deformation of the side sill in the event of the side collision of the vehicle.

(b) Description of the Related Art

In electric vehicles, a battery is typically mounted on a lower surface of a floor panel.

The battery may be subject to damage due to lack of a space capable of absorbing a collision load in the event of a side collision of the vehicle.

To avoid such a defect, various collision prevention structures have been applied, and as an example, a stiffness of a side sill coupled to a side surface of the floor panel may be reinforced.

For the side sill, a side sill inner and a side sill outer typically are bonded in a longitudinal direction of the vehicle. In addition, a side sill reinforcement material may be manufactured by extrusion or the like, and may be provided in an internal space formed by the side sill inner and the side sill outer to reinforce the stiffness of the side sill.

Therefore, in the event of side collision, a side surface of the battery may experience reduced damage by an external impact from the side collision.

However, compared to the occurrence of a front or rear collision of the vehicle, in the event of a side collision, there may not be enough space to absorb the collision load, and as a capacity of the battery increases, a space to absorb the collision load becomes smaller.

Since the conventional structure of the side sill is not sufficient to protect the battery from being damaged by the side collision, a possibility of damage to the battery increases in the event of side collision.

In addition, when the side sill is not configured to sufficiently support the side collision, a collision load may cause deformation of a compartment in which an occupant occupies, resulting in potential injury to the occupant.

SUMMARY

The present disclosure is directed to a vehicle, and in particular, a side lower structure of the vehicle that is reinforced to absorb the impact of a side collision of the vehicle.

The present disclosure is directed to providing a side lower structure of a vehicle, which may reduce deformation of a side sill in the event of side collision and allow a side collision load to be absorbed in a narrower space in the side lower structure of the vehicle.

The present disclosure is also directed to providing a side lower structure of a vehicle, which prevents a bending behavior of a seat cross member and supports a collision load by the seat cross member.

In order to achieve the objects, a side lower structure of a vehicle according to the present disclosure may include a seat cross member disposed in a width direction of the vehicle and assembled to a floor panel of the vehicle, a seat cross member extension assembled to the seat cross member and connecting a side sill inner with the seat cross member, and inclined ribs formed on the seat cross member extension in the width direction of the vehicle, and disposed to be spaced by a predetermined distance from each other in a longitudinal direction of the vehicle.

The inclined ribs may have a smaller height toward an inside of the vehicle.

The inclined ribs may include first inclined ribs configured to transmit a collision load input to the side sill inner to side and upper surfaces of the seat cross member and disposed to be spaced by a predetermined distance from each other in the longitudinal direction of the vehicle on the seat cross member extension, and second inclined ribs configured to transmit the collision load input to the side sill inner to the upper surface of the seat cross member and formed between the first inclined ribs spaced apart from each other.

The seat cross member may be formed with a reinforcement rib connecting the upper and lower surfaces of the seat cross member inside the seat cross member formed in a barrel shape.

The inclined ribs may be aligned with the reinforcement ribs to be positioned on a virtual plane.

The seat cross member extension may include a body in contact with the upper surface of the seat cross member, an upper flange portion coupled to an upper surface of the side sill inner, a vertical flange portion extending downward from the upper flange portion and coupled to a side surface of the side sill inner, and a lower flange portion extending from a lower end of the vertical flange portion in a direction parallel to the floor panel and coupled to the floor panel, wherein the first inclined rib extends downward from the upper flange portion and is formed to be in contact with the side surface of the seat cross member and connected to the lower flange portion, and the second inclined rib extends downward from the upper flange portion and is formed to be connected to the body.

An auxiliary rib may be formed on the body in the longitudinal direction of the vehicle to intersect the first inclined rib and the second inclined rib.

An inner end of the body facing the inside of the vehicle may be formed with a curved portion to be rounded toward an outside of the vehicle.

The curved portions may be formed on an end of the inclined rib at a predetermined distance.

Among the inclined ribs, inclined ribs disposed on frontmost and rearmost portions in the longitudinal direction of the vehicle may be aligned with the reinforcement ribs on the same virtual plane, and the remaining inclined ribs may be alternately aligned with the reinforcement ribs.

The seat cross member extension may be manufactured by die casting, and the seat cross member may be manufactured by extrusion.

The seat cross member extension may be coupled to each of the upper and side surfaces of the side sill inner, coupled to each of the upper and side surfaces of the seat cross member, and coupled to the upper surface of the floor panel.

The seat cross member extension may be coupled to the upper and side surfaces of the side sill inner by a screw or a fastening bolt.

The seat cross member extension may be fastened to the upper and side surfaces of the seat cross member by a screw.

An inner end of the seat cross member extension facing the inside of the vehicle may be coupled to the upper surface of the seat cross member by welding.

The seat cross member extension may be coupled to the upper surface of the floor panel by a rivet.

The vehicle may be an electric vehicle in which a battery is mounted on a lower surface of the floor panel.

A vehicle may incorporate the above-described side lower structure, e.g., for absorbing the impact of a side collision of the vehicle.

A vehicle may include: a floor panel mounted with a battery, a side sill coupled to a side surface of the floor panel, a seat cross member disposed in a width direction of the vehicle and assembled to the floor panel, and a seat cross member extension assembled to the seat cross member and connecting a side sill inner with the seat cross member to support a side collision load.

According to the side lower structure of the vehicle of the present disclosure having the above configuration, the seat cross member may support the side sill inner as the collision load input in the event of side collision is transmitted to the seat cross member through the seat cross member extension. Therefore, it is possible to improve the stiffness of the side sill to prevent or reduce a rotated or compressed deformation of the side sill, thereby preventing deformation of the compartment and damage to the battery.

In addition, it is possible to support the collision load by changing the bending behavior of the seat cross member due to the side collision to the compression behavior.

In addition, it is possible to increase the stiffness of the side sill and prevent the bending behavior of the seat cross member, thereby improving the overall transverse bending and torsional stiffness of the vehicle.

DESCRIPTION OF SPECIFIC EMBODIMENTS

Figure 1:
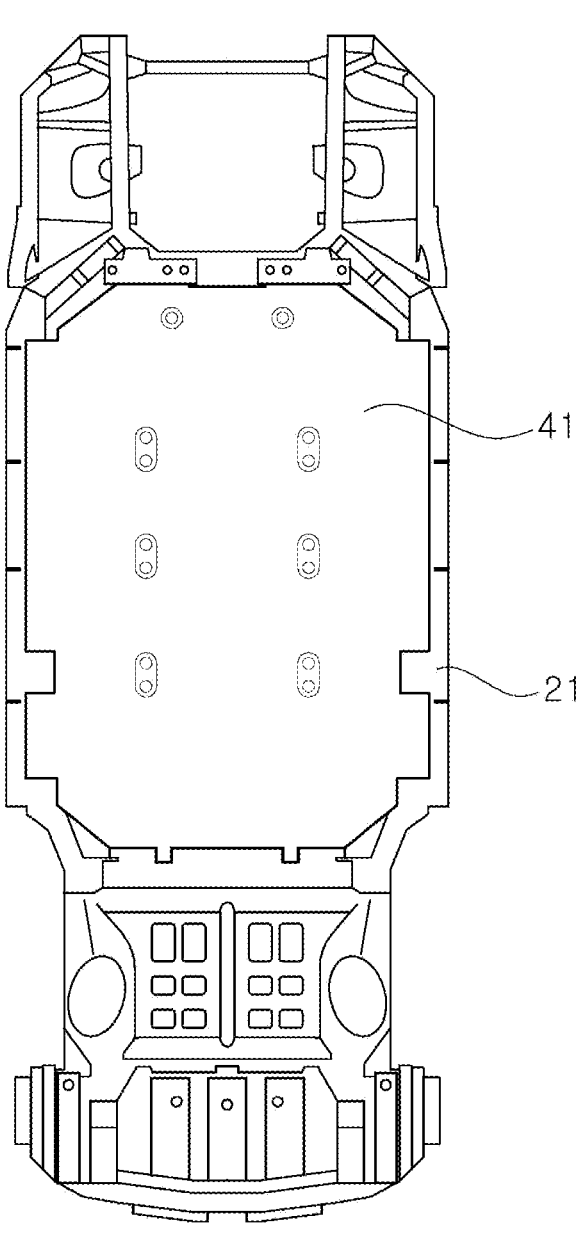
FIG. 1 is a plan view illustrating a state in which a battery is mounted on a lower surface of a floor panel.
Figure 2:
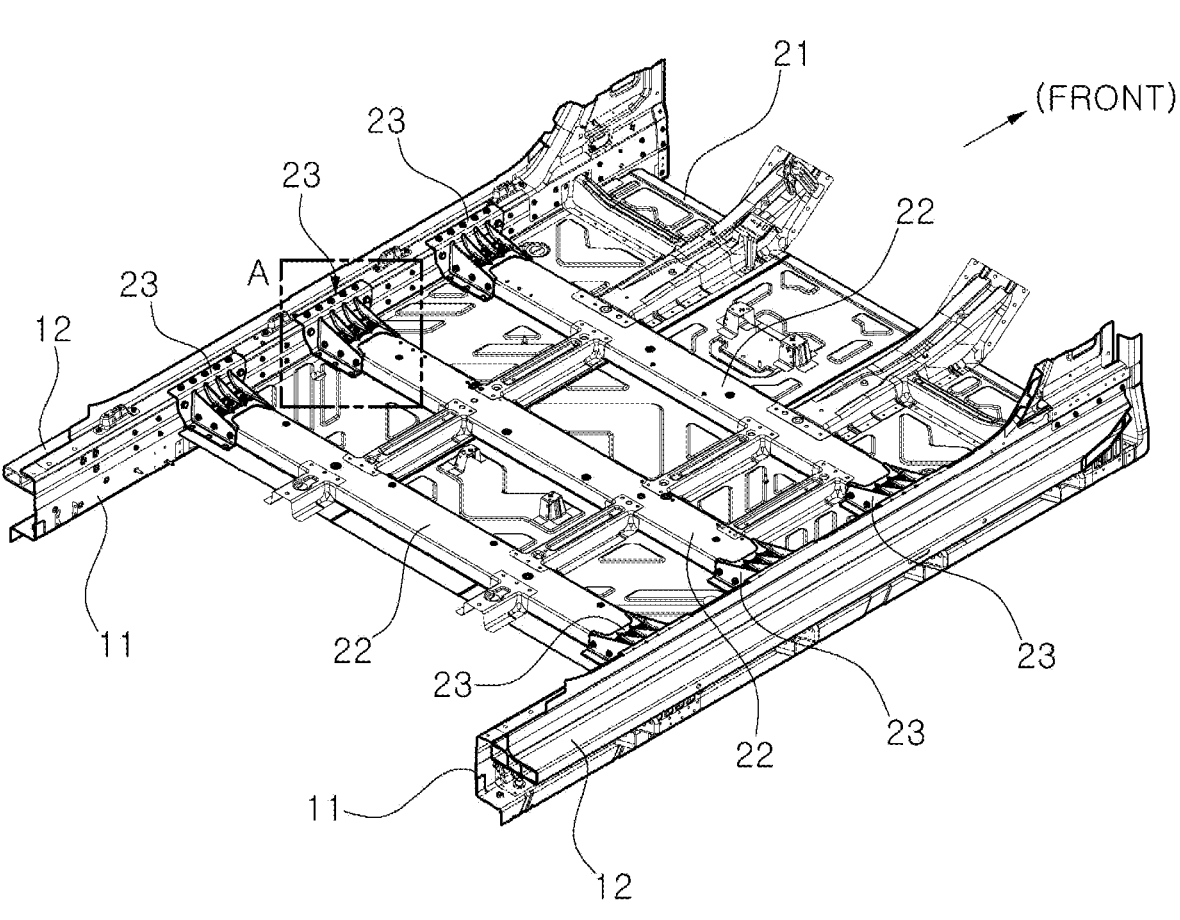
FIG. 2 is a perspective view illustrating a state in which a side lower structure of a vehicle according to exemplary embodiment of the present disclosure is applied.
Figure 3:
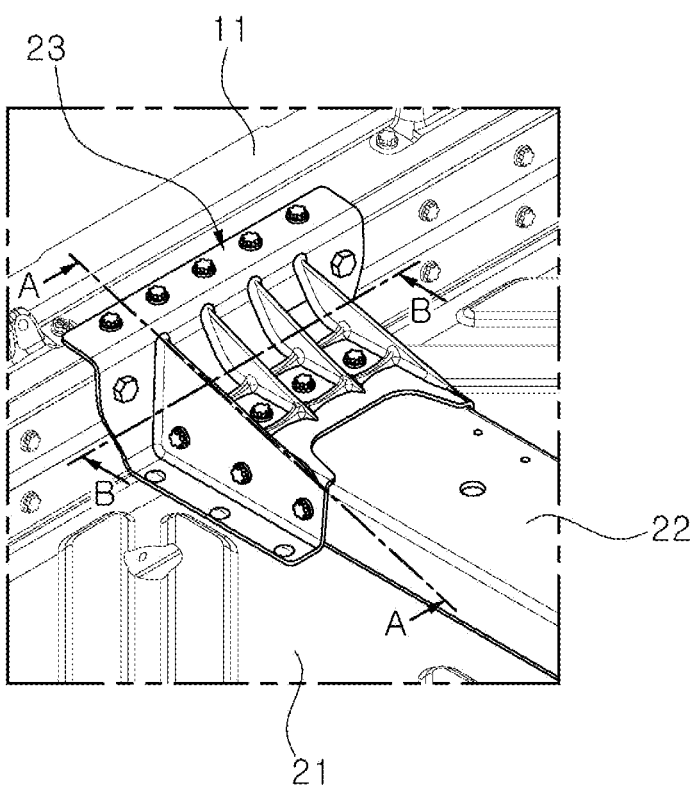
FIG. 3 is an enlarged view of portion A in FIG. 2.
Figure 4:
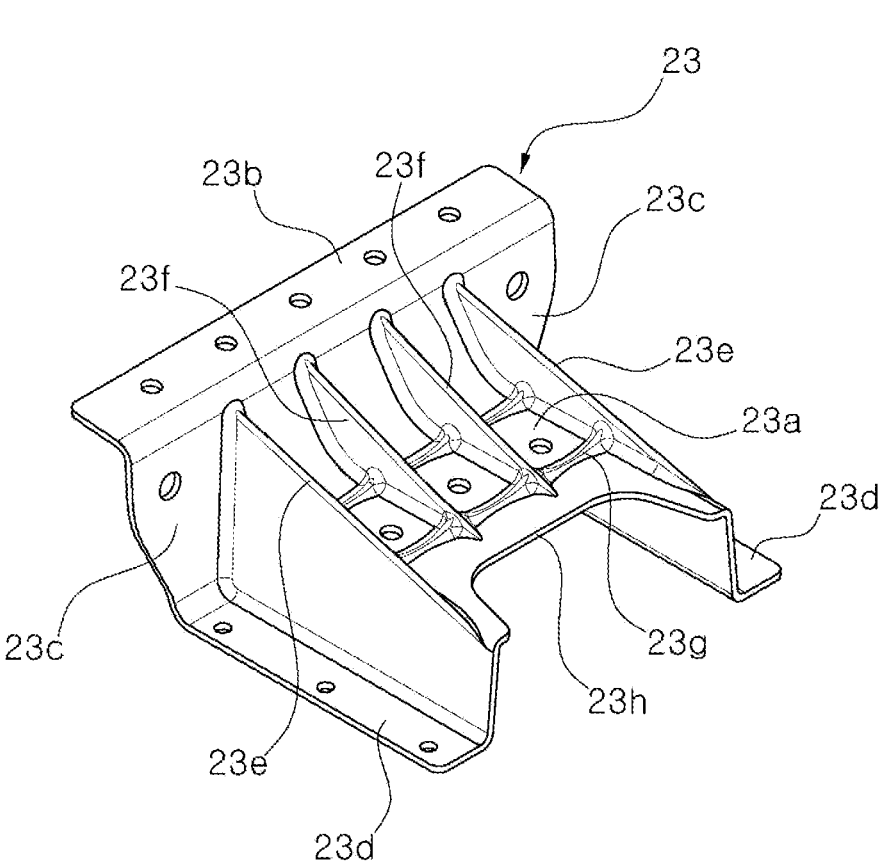
FIG. 4 is a perspective view of a seat cross member extension connecting a side sill with a seat cross member in the side lower structure of the vehicle according to exemplary embodiment of the present disclosure.
Figure 5:
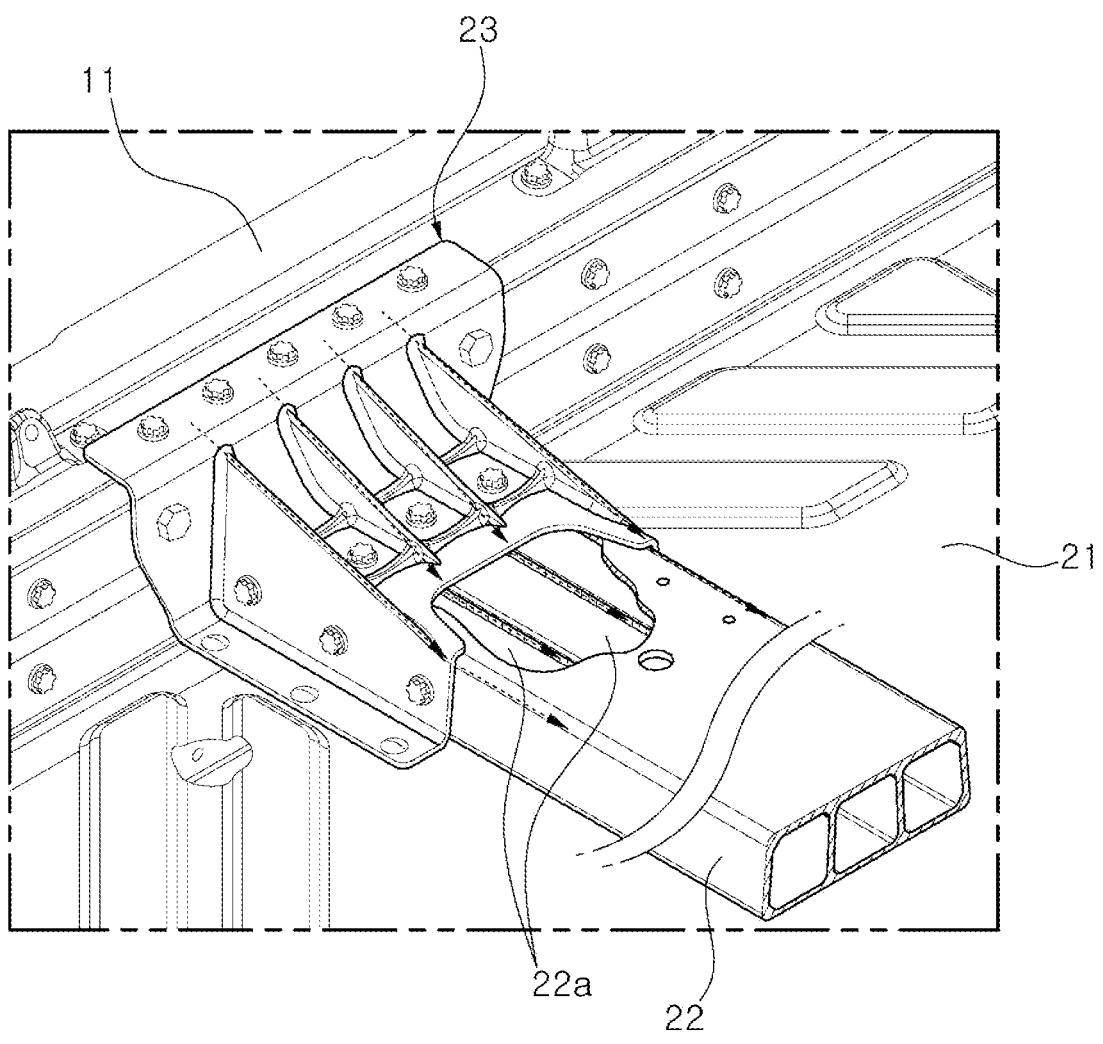
FIG. 5 is a partially enlarged perspective view illustrating a load path according to the side lower structure of the vehicle according to exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a lower portion of a side surface of a vehicle according to the present disclosure will be described in detail with reference to the accompanying drawings.

The side lower structure of the vehicle according to the present disclosure may include a seat cross member 22 disposed in a width direction of the vehicle and assembled to a floor panel 21 of the vehicle, and a seat cross member extension 23 assembled to each of both ends of the seat cross member 22 and connecting a side sill inner 11 with the seat cross member 22, wherein inclined ribs 23e and 23f, which are formed in a width direction of the vehicle to have a smaller height toward an inside of the vehicle, are disposed to be spaced by a predetermined distance from each other on the seat cross member extension 23 in a longitudinal direction of the vehicle.

The floor panel 21 forms a lower surface of a cabin in the vehicle. When the vehicle is an electric vehicle, a lower surface of the floor panel 21 may be used as a space for mounting a large-capacity battery 41. That is, as illustrated in FIG. 1, the battery may be mounted on the lower surface of the floor panel 21.

The seat cross member 22 may be coupled to an upper portion of the floor panel 21. The seat cross member 22 may be disposed in the width direction of the vehicle. The seat cross member 22 may serve to reinforce the stiffness of the floor panel 21 in the width direction of the vehicle. In addition, a seat of the vehicle may be mounted using the seat cross member 22.

A side sill may be coupled to both ends of the floor panel 21.

The side sill may include the side sill inner 11 directly coupled to both ends of the floor panel 21 and the side sill outer 13 having each of upper and lower ends coupled to the side sill inner 11. The side sill inner 11 and the side sill outer 13 may become a structure that provides stiffness to a side lower portion of the vehicle.

A battery mounting bracket 43 to which an end of the battery 41 is fixed may be fastened to a lower surface of the side sill inner 11. Therefore, the battery 41 may be mounted on the floor panel 21.

Since the battery 41 is mounted on the lower surface of the floor panel 21, a side sill reinforcement material 12 manufactured by extrusion using an aluminum alloy or the like may be typically applied between the side sill inner 11 and the side sill outer 13. Alternatively, thicknesses of the seat cross member 22 and the side sill reinforcement material 12 are increased. Therefore, it is possible to increase the stiffness of the vehicle in the width direction, thereby preventing damage to the battery 41 in the event of side collision.

In an electric vehicle, in order to increase a distance at which the vehicle may travel after one-time charging operation, that is, a distance to empty, the capacity of the battery 41 may gradually increases, and as the capacity of the battery 41 increases, a space of a side surface of the battery 41 capable of absorbing a collision load may gradually decreases. Therefore, the required stiffness of the structure to support the collision load may gradually increases, and this is solved by adding the side sill reinforcement material 12 or increasing the thickness of each component. However, due to the increased weight of the vehicle, the efficiency of increasing the distance to empty may be lowered.

In order to solve this defects, in the present disclosure, the seat cross member extension 23 to which a structure capable of transmitting and distributing the collision load from the side sill inner 11 to the seat cross member 22 is applied may be applied.

The seat cross member extension 23 may be installed at each of both ends of the seat cross member 22 to connect the side sill inner 11 with the seat cross member 22 so that the collision load is transmitted from the side sill to the seat cross member extension 23.

The seat cross member extension 23 may be coupled by surrounding the end of the seat cross member 22 and coupled to upper and side surfaces of the side sill inner 11 and the floor panel 21.

The seat cross member extension 23 may include a body 23a in contact with the upper surface of the seat cross member 22, an upper flange portion 23b coupled to an upper surface of the side sill inner 11, a vertical flange portion 23c extending downward from the upper flange portion 23b and coupled to a side surface of the side sill inner 11, and a lower flange portion 23d extending from a lower end of the vertical flange portion 23c in a direction parallel to the floor panel 21 and coupled to the floor panel 21.

In particular, the inclined ribs 23e and 23f for transmitting and distributing the load from the side sill inner 11 to the seat cross member 22 may be formed on the seat cross member extension 23. The inclined ribs 23e and 23f may be formed in the width direction of the vehicle to have a smaller height from the seat cross member extension 23 toward the inside of the vehicle. That is, outer ends of the inclined ribs 23e and 23f may be formed higher than inner ends of the inclined ribs 23e and 23f by a height h. Therefore, the load input to the side sill inner 11 in the event of side collision is transmitted to the seat cross member 22 through the inclined ribs 23e and 23f.

As the inclined ribs 23e and 23f are disposed to be spaced by a predetermined distance from each other in the longitudinal direction of the vehicle, the load may be distributed through each of the inclined ribs 23e and 23f and transmitted to the seat cross member 22 without being concentrated on any one of the inclined rib 23e and 23f.

The inclined ribs 23e and 23f may include the first inclined rib 23e and the second inclined rib 23f.

The first inclined rib 23e may transmit the collision load input to the side sill inner 11 to the side surface and upper surface of the seat cross member 22 and may be disposed to be spaced by a predetermined distance from the seat cross member extension 23 in the longitudinal direction of the vehicle. The first inclined rib 23e may be formed to be in contact with the side surface of the seat cross member 22 from the upper flange portion 23b and be connected to the lower flange portion 23d.

The second inclined rib 23f may transmit the collision load input to the side sill inner 11 to the upper surface of the seat cross member 22 and may be formed between the second inclined rib 23f and the first inclined rib 23e spaced apart from each other. The second inclined rib 23f may connect the body 23a from the upper flange portion 23b.

There is a common point in that the first inclined rib 23e and the second inclined rib 23f transmit the collision load input to the side sill inner 11 to the seat cross member 22. However, since the first inclined rib 23e is positioned outside the second inclined rib 23f in the seat cross member extension 23, the first inclined rib 23e may transmit the collision load to both the upper and side surfaces of the seat cross member extension 23.

An auxiliary rib 23g may be formed on the body 23a to intersect the first inclined rib 23e and the second inclined rib 23f. The auxiliary rib 23g may be formed in the longitudinal direction of the vehicle and intersect the first inclined rib 23e and the second inclined rib 23f, and thus may be formed in a lattice structure by connecting the first inclined rib 23e with the second inclined rib 23f.

A curved portion 23h may be formed at an inner end of the body 23a of the seat cross member extension 23, which faces the inside of the vehicle. The curved portion 23h may be formed to be rounded to the outside of the vehicle.

Figure 9:
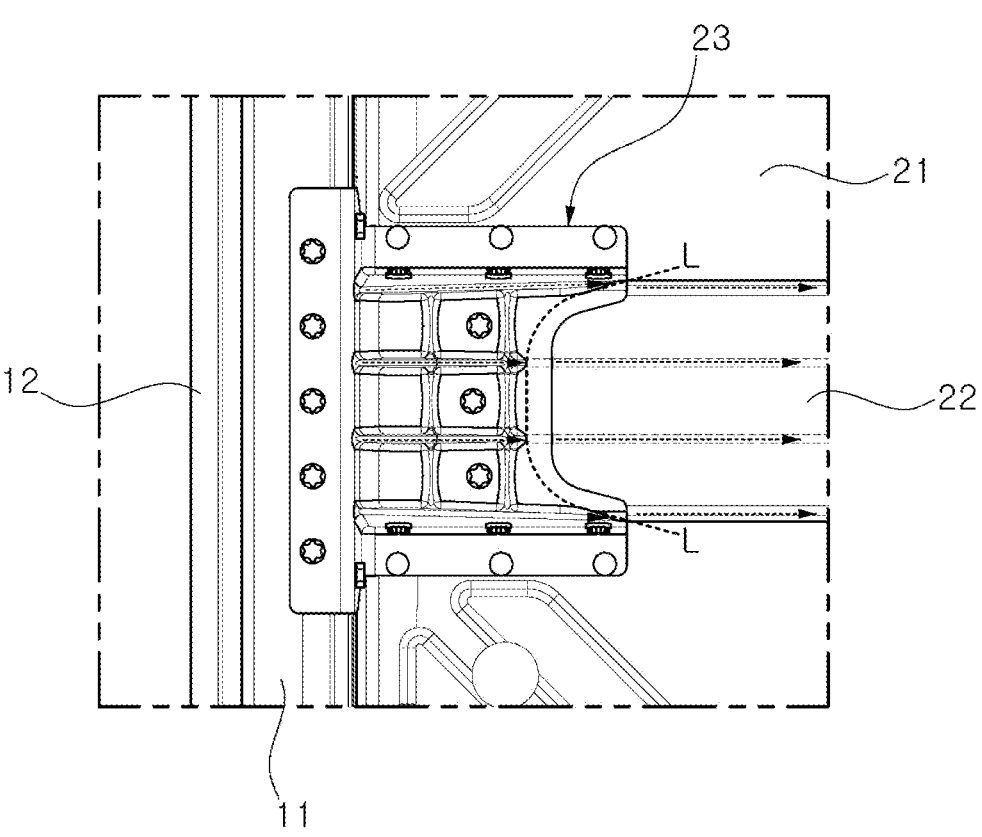
FIG. 9 is a plan view illustrating a load path according to the side lower structure of the vehicle according to exemplary embodiment of the present disclosure.

Meanwhile, an end of the first inclined rib 23e and an end of the second inclined rib 23f may be formed to be spaced by a predetermined distance of the curved portion 23h from each other. FIG. 9 illustrates that the end of the first inclined rib 23e and the end of the second inclined rib 23f are positioned on line L-L spaced apart from the curved portion 23h.

The seat cross member extension 23 may be made by casting, in particular, die casting. Since the seat cross member extension 23 is formed of a single body and is manufactured by the die casting, the seat cross member extension 23 may be manufactured with accurate dimensions and may have excellent mechanical properties, thereby sufficiently providing performance required between the side sill inner 11 and the seat cross member 22.

Meanwhile, a structure corresponding to the first inclined rib 23e and the second inclined rib 23f may be formed on the seat cross member 22.

That is, reinforcement ribs 22a may be formed inside the seat cross member 22. The reinforcement rib 22a may be formed in a shape that connects an upper surface with a lower surface inside the seat cross member 22 formed in a barrel shape through extrusion in the longitudinal direction of the seat cross member 22. Since the reinforcement ribs 22a are formed in the longitudinal direction of the seat cross member 22, the reinforcement ribs 22a may be formed in the width direction of the vehicle. The reinforcement ribs 22a may be disposed to be spaced by a predetermined distance from each other in the longitudinal direction of the vehicle inside the seat cross member 22.

The reinforcement ribs 22a may be aligned with the first inclined rib 23e and the second inclined rib 23f to be positioned on a virtual plane.

Since the end of the first inclined rib 23e and the end of the second inclined rib 23f are formed to be spaced by the predetermined distance of the curved portion 23h from each other, the collision load may be transmitted from an outer end of the first inclined rib 23e and an outer end of the second inclined rib 23f to an inner end of the first inclined rib 23e and an inner end of the second inclined rib 23f and then distributed to the entire curved portion 23h.

When there is no distance between the inner end of the first inclined rib 23e and the inner end of the second inclined rib 23f, the collision load transmitted therebetween may be transmitted to the seat cross member 22 in a concentrated state. However, since the distance is formed between the inner end of the first inclined rib 23e and the inner end of the second inclined rib 23f and the curved portion 23h, the collision load concentrated on the inner end of the first inclined rib 23e and the inner end of the second inclined rib 23f may be distributed to the entire section of the curved portion 23h.

Figure 10:
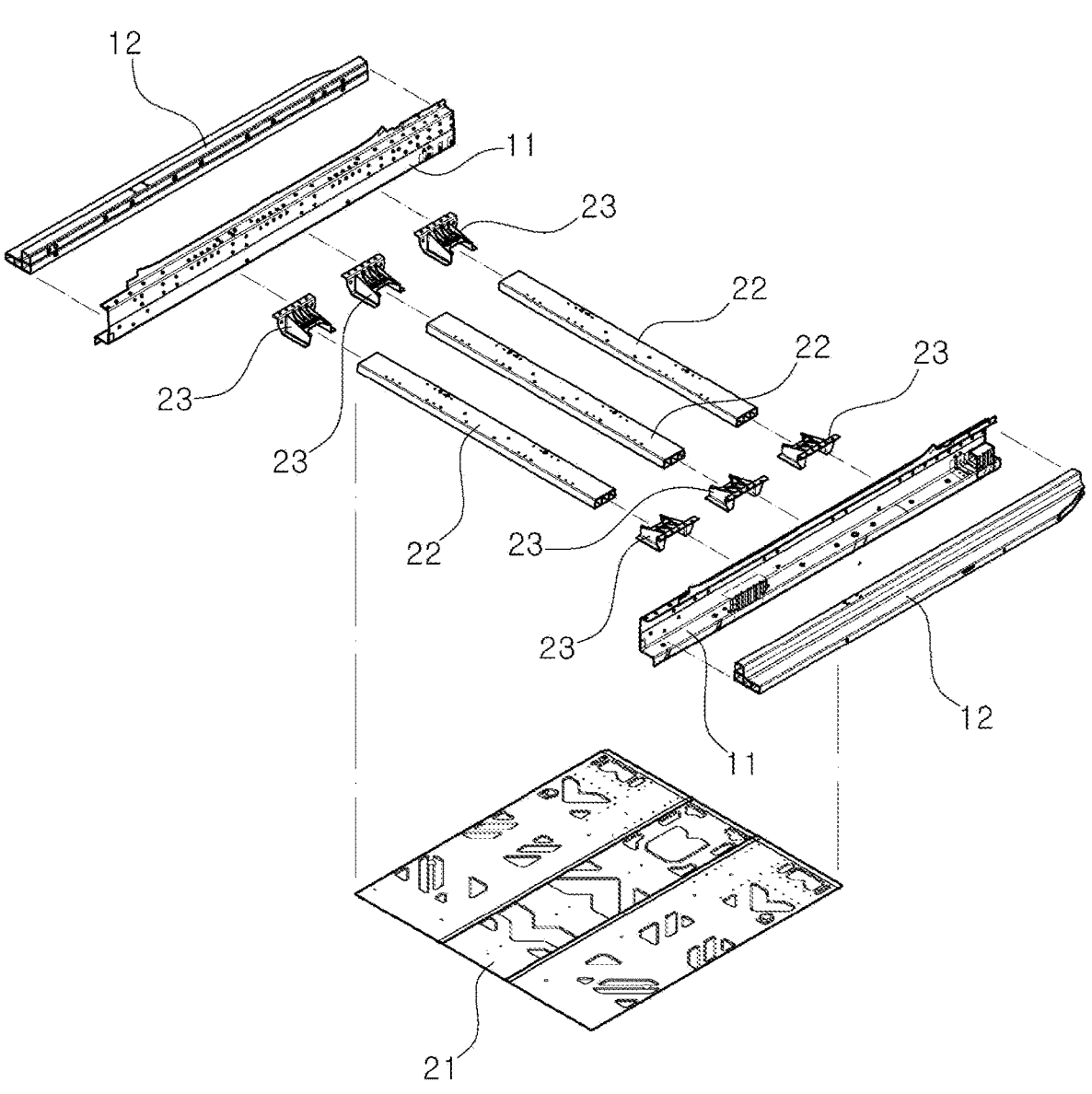
FIG. 10 is an exploded perspective view of the side lower structure of the vehicle according to exemplary embodiment of the present disclosure.

FIG. 10 illustrates a coupling relationship of components constituting the side lower structure of the vehicle according to the present disclosure.

The side sill inner 11 and the side sill reinforcement material 12 may be assembled. In addition, the seat cross member 22 and the seat cross member extension 23 may be assembled.

An assembly of the seat cross member 22 and the seat cross member extension 23 may be assembled to the floor panel 21, and then an assembly of the side sill inner 11 and the side sill reinforcement material 12 may be assembled.

Figure 11:
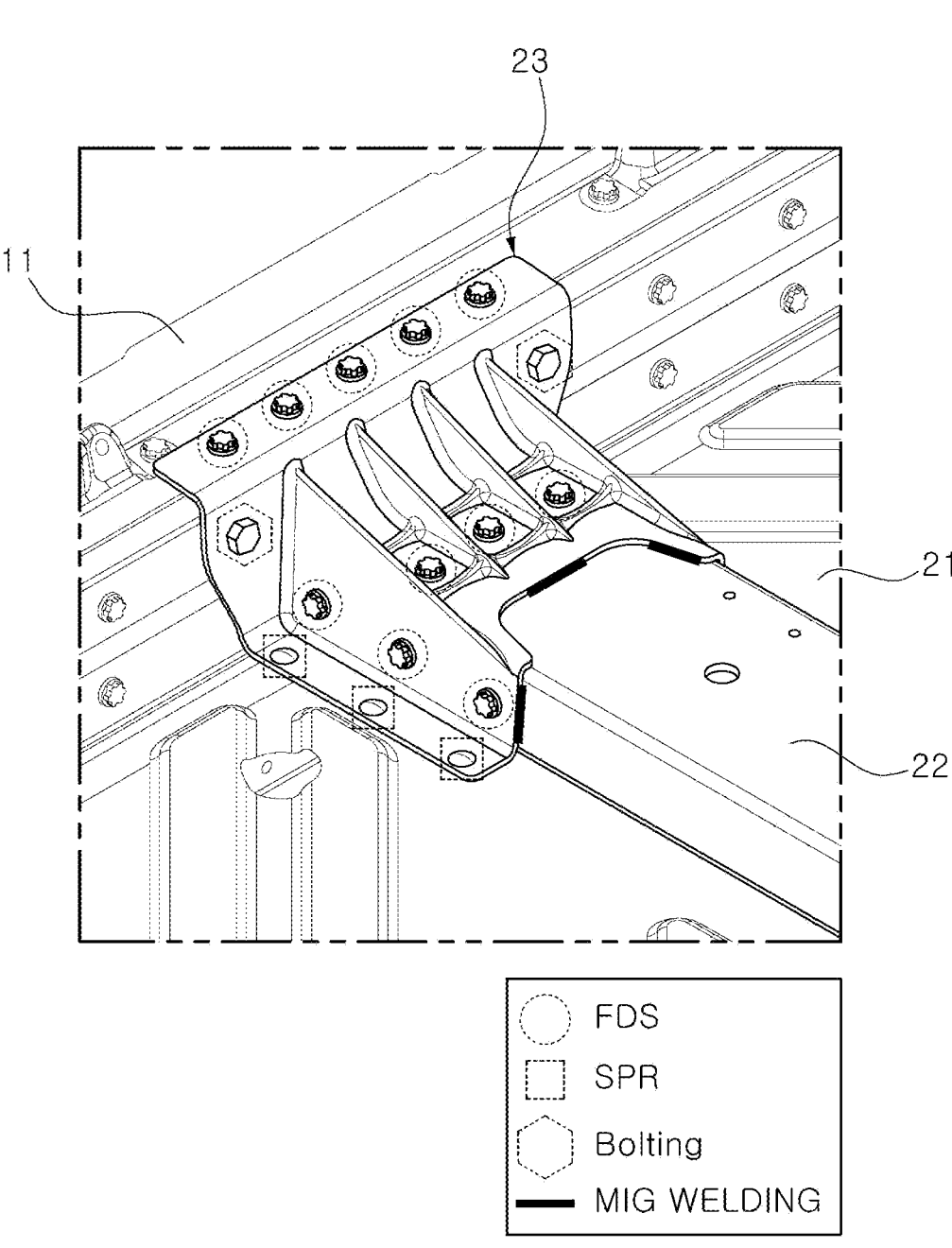
FIG. 11 is an enlarged perspective view illustrating a major portion of the side lower structure to illustrate a method of coupling the seat cross member extension in the side lower structure of the vehicle according to exemplary embodiment of the present disclosure.

FIG. 11 illustrates a method in which the seat cross member extension 23 is coupled to the side sill inner 11, the seat cross member 22, and the floor panel 21.

The seat cross member extension 23 may be coupled to the upper and inner surfaces of the side sill inner 11.

The upper flange portion 23b of the seat cross member extension 23 may be coupled to the upper surface of the side sill inner 11 using a screw. For example, the upper flange portion 23b may be coupled to the side sill inner 11 by a flow drill screw (FDS) that passes through the upper flange portion 23b and the side sill inner 11 by rotation and allows a fastening force to be provided by a screw thread. The vertical flange portion 23c of the seat cross member extension 23 may be coupled to the side surface of the side sill inner 11 by bolting using a fastening bolt.

The seat cross member extension 23 may be coupled to each of the upper and side surfaces of the seat cross member 22. The body 23a of the seat cross member extension 23 and the first inclined rib 23e may be coupled to the upper and side surfaces of the seat cross member 22 and coupled by the screw method, particularly, the FDS.

Meanwhile, the inner end of the body 23a, that is, the curved portion 23h may be coupled to the upper surface of the seat cross member 22 by welding, particularly, metal inert gas (MIG) welding. In addition, the inner end of the seat cross member extension 23 and the side surface of the seat cross member 22 may be also coupled by welding such as MIG welding.

The seat cross member extension 23 may be coupled to the floor panel 21 by a rivet. The lower flange portion 23d of the seat cross member extension 23 and the floor panel 21 may be coupled by a rivet, in particular, a self-piercing rivet (SPR).

An operation in which a load is transmitted and distributed by the side lower structure of the vehicle according to the present disclosure having the above configuration in the event of side collision of the vehicle will be described as follows.

Figure 6:
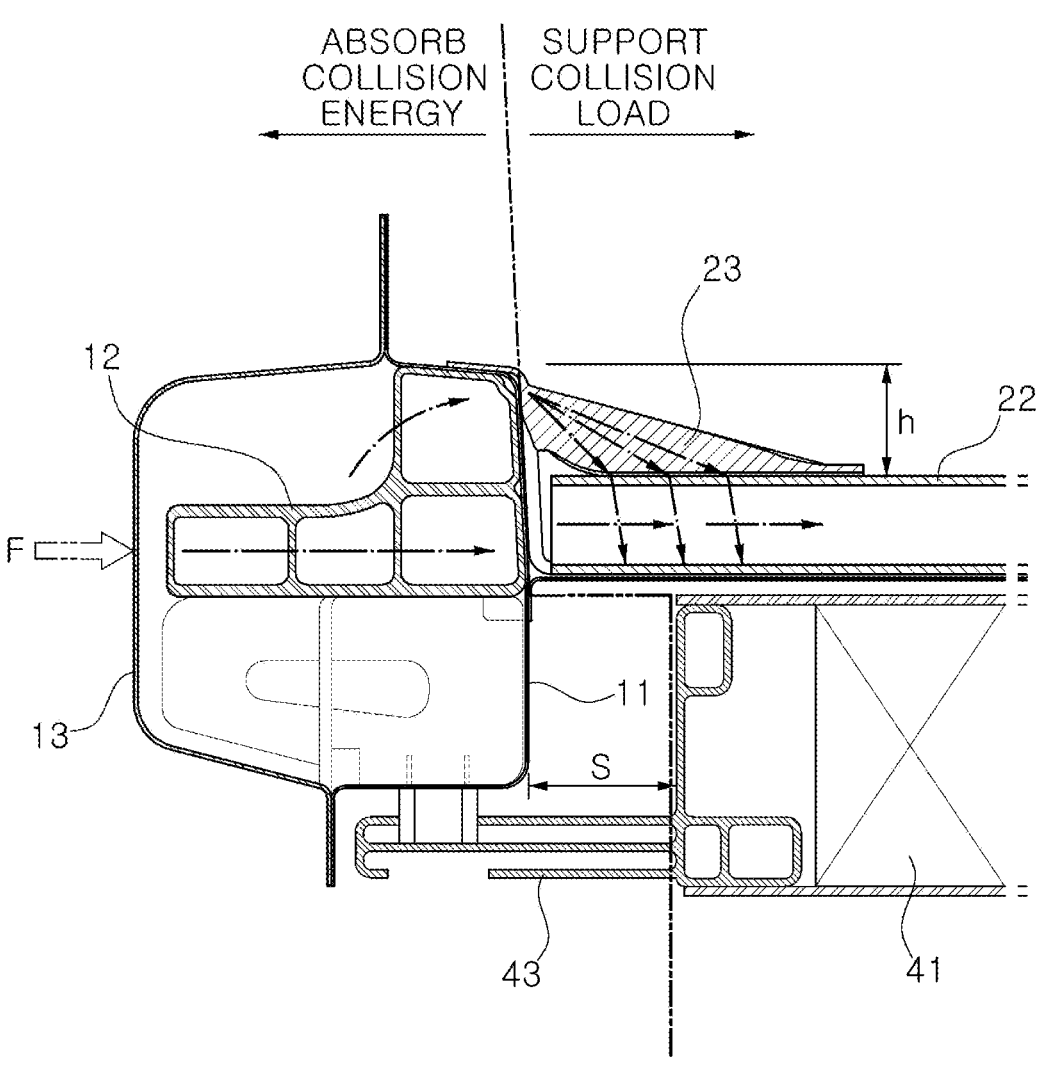
FIG. 6 is a cross-sectional view along a line A-A in FIG. 3.
Figure 7:
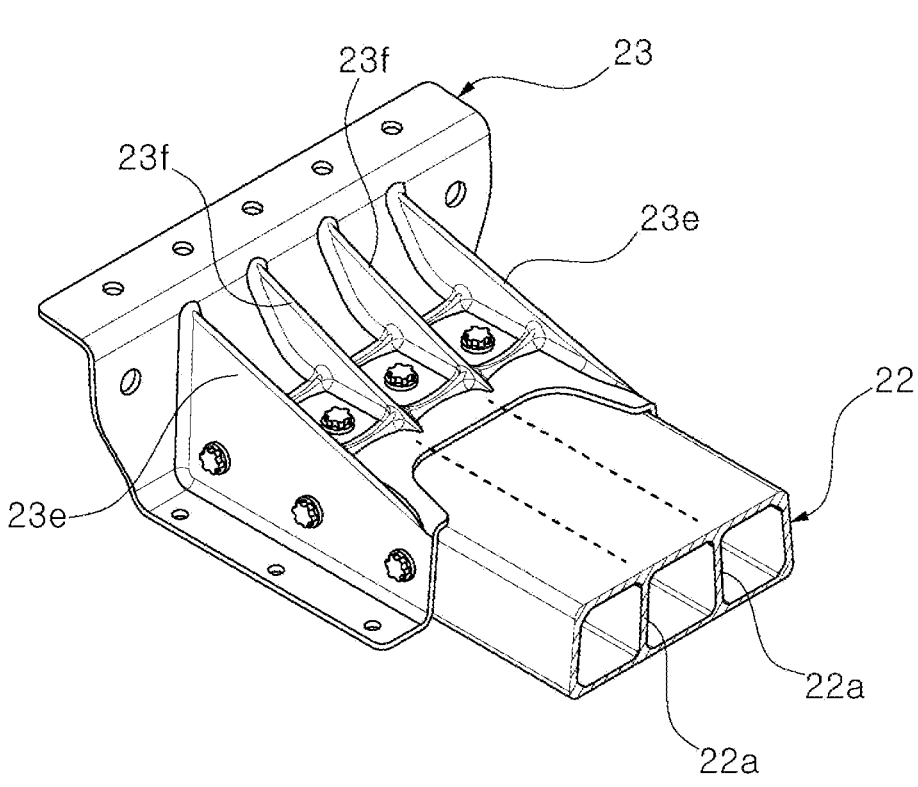
FIG. 7 is a perspective view illustrating a connection relationship between a seat cross member extension and the seat cross member in the side lower structure of the vehicle according to exemplary embodiment of the present disclosure.

When the side surface of the vehicle is hit (see arrow F in FIG. 6), the collision load may be input to the side sill outer 13, the side sill reinforcement material 12, and the side sill inner 11. The side sill outer 13, the side sill reinforcement material 12, and the side sill inner 11 may absorb collision energy while being partially deformed by the collision load. In FIG. 6, a left side is illustrated as a region in which the collision energy is absorbed.

Meanwhile, a part of the collision load transmitted to the side sill reinforcement material 12 may be directly transmitted to the seat cross member 22, and the rest may be transmitted to the seat cross member 22 side through the upper portion of the side sill reinforcing member. The collision load transmitted to the upper portion of the side sill reinforcement material 12 may presses the upper portion of the side sill reinforcement material 12 to the inside of the vehicle, thereby causing the bending behavior of the seat cross member 22.

However, as the seat cross member extension 23 is applied, the bending behavior of the seat cross member 22 may be transformed into the compression behavior of the seat cross member 22.

The seat cross member extension 23 may support the collision load input through the side sill inner 11. That is, the first inclined ribs 23e and the second inclined ribs 23f of the seat cross member extension 23 may uniformly transmit the collision load input through the upper portion of the side sill reinforcement material 12 through the inclination to the seat cross member 22, thereby causing the compression behavior of the seat cross member 22 instead of the bending behavior thereof. Since the seat cross member 22 is manufactured by the extrusion and has the reinforcement ribs 22a formed therein, it is possible to sufficiently support a compressive load even when the compressive load acts on the seat cross member 22. Therefore, in FIG. 6, a right side may be illustrated as a region in which the collision load is supported.

Figure 8:
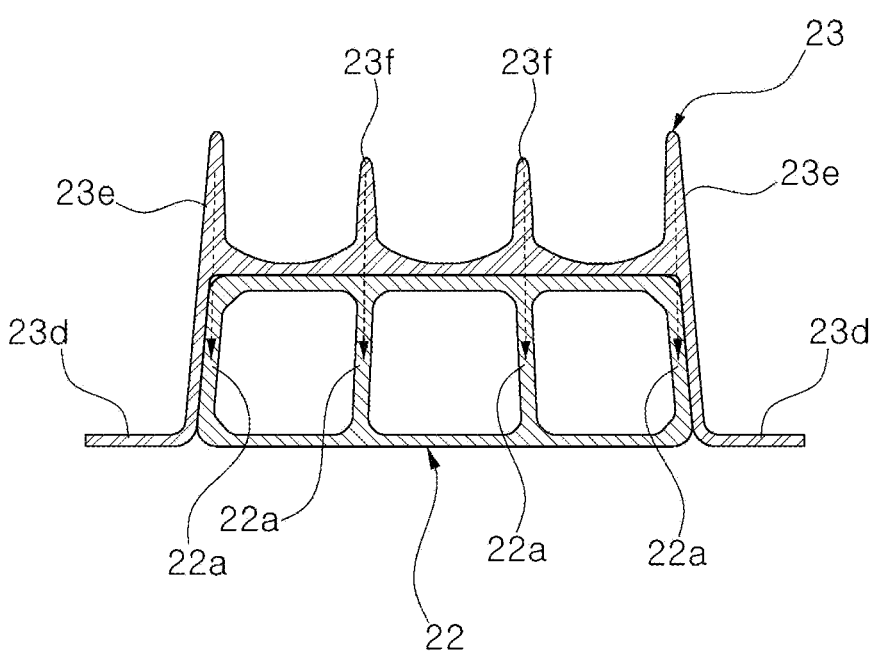
FIG. 8 is a cross-sectional view along a line B-B in FIG. 3.

In particular, since each of the first inclined rib 23e and the second inclined rib 23f are aligned with an outer wall of the seat cross member 22 or the reinforcement rib 22a, the load input to the first inclined rib 23e and the second inclined rib 23f may be transmitted to the outer wall of the seat cross member 22 or the reinforcement rib 22a to support the collision load (see FIG. 8). That is, since the first inclined rib 23e and the second inclined rib 23f are aligned with the outer wall of the seat cross member 22 or the reinforcement rib 22a, it is possible to sufficiently support a part of the collision load input to the seat cross member extension 23.

Therefore, it is possible to prevent the bending behavior of the seat cross member 22 in the event of side collision of the vehicle, thereby preventing damage to the battery 41 mounted on a lower portion of the floor panel 21.

Figure 12:
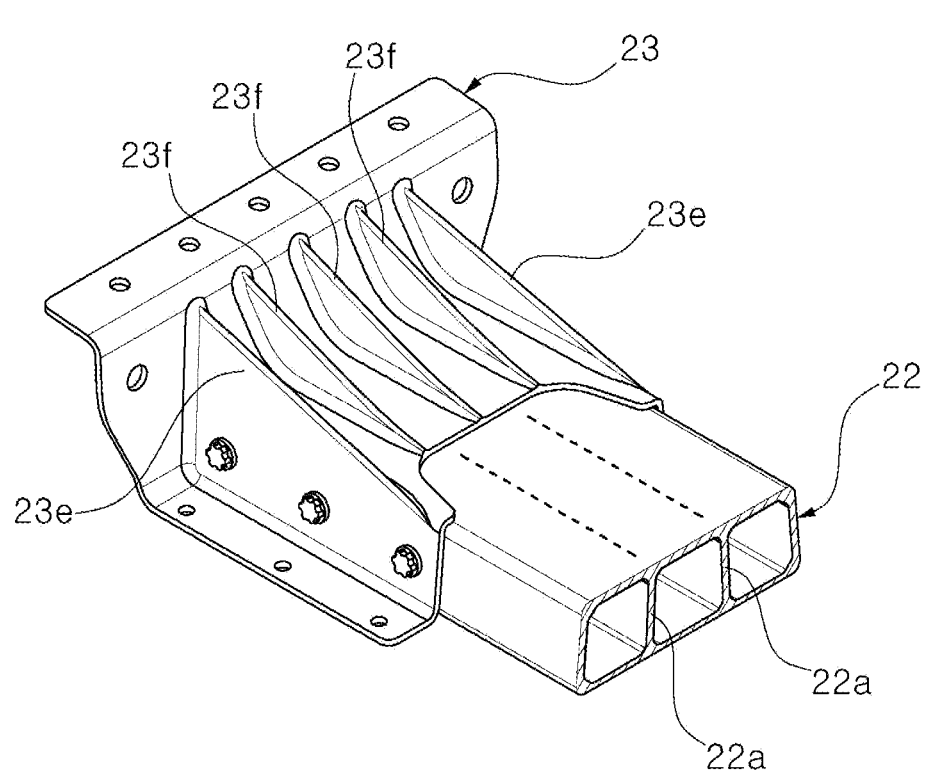
FIG. 12 is a perspective view illustrating a connection relationship between the seat cross member extension and the seat cross member in the side lower structure of the vehicle according to another exemplary embodiment of the present disclosure.
Figure 13:
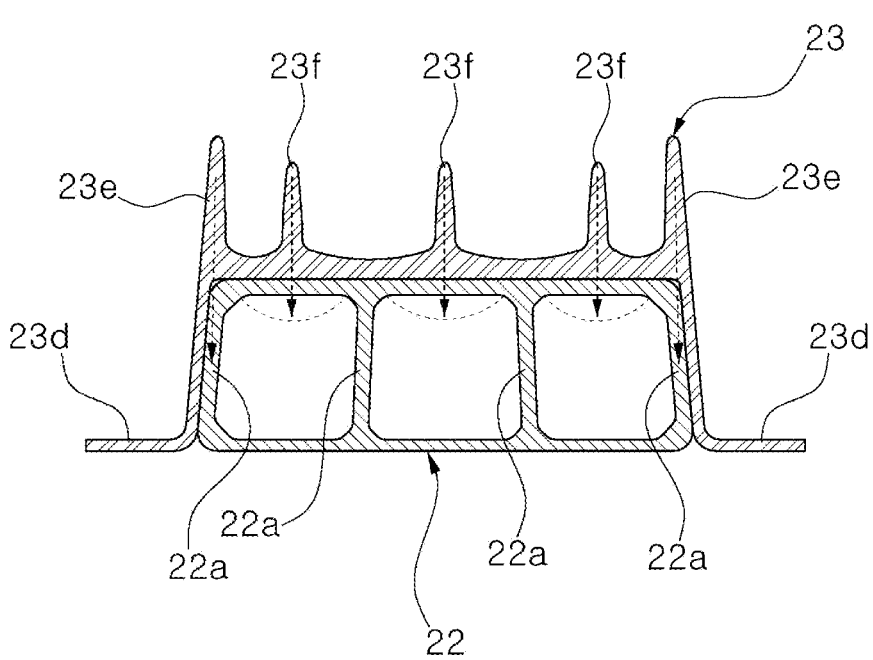
FIG. 13 is a cross-sectional view illustrating a load path according to the side lower structure of the vehicle according to another exemplary embodiment of the present disclosure.

FIGS. 12 and 13 illustrate a side lower structure of a vehicle according to another exemplary embodiment of the present disclosure.

Since the side lower structure of the vehicle according to another embodiment of the present disclosure is basically the same as the side lower structure of the vehicle according to the exemplary embodiment described above, a description of overlapping contents will be omitted.

However, in the embodiment as shown in FIG. 12, the inclined ribs 23e disposed on frontmost and rearmost portions in the longitudinal direction of the vehicle may be aligned to be positioned on the same plane as the reinforcement ribs 22a, and the inclined ribs 23f may be alternately aligned with the reinforcement ribs 22a.

Some of the inclined ribs 23e and 23f of the seat cross member extension 23 and the reinforcement ribs 22a of the seat cross member 22 may be positioned on the same virtual plane, but the rest may be aligned differently from the above.

That is, the first inclined ribs 23e disposed on the frontmost and rearmost portions directions in the longitudinal direction of the vehicle may be aligned to be positioned on the same virtual plane as the reinforcement ribs 22a. However, the second inclined ribs 23f may be not positioned on the same virtual plane as the reinforcement ribs 22a, and the second inclined ribs 23f and the reinforcement ribs 22a may be alternately aligned.

Since the second inclined ribs 23f are aligned between the reinforcement ribs 22a, when the load is transmitted from the side sill inner 11 to the seat cross member extension 23, the loads transmitted through the first inclined ribs 23e may be supported by the first inclined ribs 23e and the reinforcement ribs 22a as in the above-described embodiment. However, since the loads transmitted through the second inclined ribs 23f are input between the reinforcement ribs 22a, deformation of the upper surface of the seat cross member 22 may be caused. Through this process, when the side collision of an actual vehicle occurs, a part of the collision load may be absorbed by deformation of the upper surface of the seat cross member 22.

As described above, in the present disclosure, by inducing deformation of the upper surface of the seat cross member 22 so that the collision load is lost, it is possible to prevent the bending behavior of the seat cross member 22. It is possible to prevent the bending deformation of the seat cross member 22 even in the event of side collision of the vehicle, thereby preventing damage to the battery 41 mounted on the lower portion of the floor panel 21.

What is claimed is:

1. A side lower structure of a vehicle, the side lower structure comprising:
   a seat cross member disposed in a width direction of the vehicle and assembled to a floor panel of the vehicle;
   a seat cross member extension assembled to the seat cross member for connecting a side sill inner with the seat cross member; and
   inclined ribs formed on the seat cross member extension in the width direction of the vehicle, the inclined ribs being spaced by a predetermined distance from each other in a longitudinal direction of the vehicle,
   wherein the inclined ribs include:
   first inclined ribs configured to transmit a collision load input to the side sill inner to side and upper surfaces of the seat cross member and disposed to be spaced in the longitudinal direction of the vehicle on the seat cross member extension; and
   second inclined ribs configured to transmit the collision load input to the side sill inner to the upper surface of the seat cross member and formed between the first inclined ribs spaced apart from each other.

2. The side lower structure of claim 1, wherein the inclined ribs have a smaller height toward an inside of the vehicle.

3. The side lower structure of claim 1, wherein the seat cross member is formed with one or more reinforcement ribs connecting upper and lower surfaces of the seat cross member inside the seat cross member.

4. The side lower structure of claim 3, wherein the inclined ribs are aligned with the reinforcement ribs positioned on a virtual plane.

5. The side lower structure of claim 1, wherein the seat cross member extension includes:
   a body in contact with an upper surface of the seat cross member;
   an upper flange portion coupled to an upper surface of the side sill inner;
   a vertical flange portion extending downward from the upper flange portion and coupled to a side surface of the side sill inner; and
   a lower flange portion extending from a lower end of the vertical flange portion in a direction parallel to the floor panel and coupled to the floor panel,
   wherein a first inclined rib extends downward from the upper flange portion and is formed to be in contact with the side surface of the seat cross member and connected to the lower flange portion, and
   wherein a second inclined rib extends downward from the upper flange portion and is formed to be connected to the body.

6. The side lower structure of claim 5, wherein an auxiliary rib is formed on the body in the longitudinal direction of the vehicle to intersect the first inclined rib and the second inclined rib, or wherein an inner end of the body facing the inside of the vehicle is formed with a curved portion to be rounded to an outside of the vehicle.

7. The side lower structure of claim 6, wherein the curved portion is formed on an end of the inclined rib at a predetermined distance.

8. The side lower structure of claim 1, wherein the inclined ribs are disposed on frontmost and rearmost portions in the longitudinal direction of the vehicle, the inclined ribs being aligned with reinforcement ribs on a same virtual plane, and other inclined ribs are alternately aligned with the reinforcement ribs.

9. The side lower structure of claim 1, wherein the seat cross member extension is manufactured by die casting, and the seat cross member is manufactured by extrusion.

10. The side lower structure of claim 1, wherein the seat cross member extension is coupled to each of the upper and side surfaces of the side sill inner, coupled to each of the upper and side surfaces of the seat cross member, and coupled to the upper surface of the floor panel.

11. The side lower structure of claim 10, wherein the seat cross member extension is coupled to the upper and side surfaces of the side sill inner by a screw or a fastening bolt.

12. The side lower structure of claim 10, wherein the seat cross member extension is fastened to the upper and side surfaces of the seat cross member by a screw, or the seat cross member extension is coupled to the upper surface of the floor panel by a rivet.

13. The side lower structure of claim 12, wherein an inner end of the seat cross member extension facing the inside of the vehicle is coupled to the upper surface of the seat cross member by welding.

14. The side lower structure of claim 1, wherein the vehicle is an electric vehicle in which a battery is mounted on a lower surface of the floor panel.

15. A vehicle comprising the side lower structure of claim 1.

16. A vehicle comprising:

a floor panel mounted with a battery;

a side sill coupled to a side surface of the floor panel;

a seat cross member disposed in a width direction of the vehicle and assembled to the floor panel;

a seat cross member extension assembled to the seat cross member and connecting a side sill inner with the seat cross member to support a side collision load; and inclined ribs formed on the seat cross member extension in the width direction of the vehicle, and spaced by a predetermined distance from each other in a longitudinal direction of the vehicle, wherein the inclined ribs include:

first inclined ribs configured to transmit a collision load input to the side sill inner to side and upper surfaces of the seat cross member and disposed to be spaced in the longitudinal direction of the vehicle on the seat cross member extension; and second inclined ribs configured to transmit the collision load input to the side sill inner to the upper surface of the seat cross member and formed between the first inclined ribs spaced apart from each other.

17. The vehicle of claim 16, wherein the seat cross member extension includes:

a body in contact with the upper surface of the seat cross member;

an upper flange portion coupled to an upper surface of the side sill inner;

a vertical flange portion extending downward from the upper flange portion and coupled to a side surface of the side sill inner; and a lower flange portion extending from a lower end of the vertical flange portion in a direction parallel to the floor panel and coupled to the floor panel, wherein the first inclined rib extends downward from the upper flange portion and is formed to be in contact with the side surface of the seat cross member and connected to the lower flange portion, and the second inclined rib extends downward from the upper flange portion and is formed to be connected to the body.

\* \* \* \* \*